US010250805B2

(12) United States Patent
Shibuno (10) Patent No.: US 10,250,805 B2
(45) Date of Patent: Apr. 2, 2019

(54) IMAGING DEVICE FOR PERFORMING DFD PROCESSING AT APPROPRIATE TIMING

(71) Applicant: Panasonic Intellectual Property Management Co., Ltd., Osaka (JP)

(72) Inventor: Koji Shibuno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 14/572,834

(22) Filed: Dec. 17, 2014

(65) Prior Publication Data

US 2015/0271475 A1    Sep. 24, 2015

(30) Foreign Application Priority Data

Mar. 19, 2014 (JP) ................................ 2014-055936
Nov. 5, 2014 (JP) ................................ 2014-224815

(51) Int. Cl.
*H04N 5/232* (2006.01)
*H04N 13/207* (2018.01)
*H04N 13/00* (2018.01)

(52) U.S. Cl.
CPC ..... *H04N 5/23245* (2013.01); *H04N 5/23212* (2013.01); *H04N 5/232123* (2018.08); *H04N 13/207* (2018.05); *H04N 2013/0081* (2013.01)

(58) Field of Classification Search
CPC ....... H04N 13/0207; H04N 2013/0081; H04N 5/23212; H04N 5/23245
USPC .......................................................... 348/46
See application file for complete search history.

(56) References Cited

U.S. PATENT DOCUMENTS

| 5,367,353 A * | 11/1994 | Amanuma ............... G02B 7/32 396/130 |
| 8,964,103 B2 * | 2/2015 | Drader ............... H04N 5/23212 348/349 |
| 2008/0205869 A1 * | 8/2008 | Nose ..................... G03B 17/20 396/77 |
| 2008/0297648 A1 | 12/2008 | Furuki et al. |

(Continued)

FOREIGN PATENT DOCUMENTS

| JP | 2963990 | 10/1999 |
| JP | 2005-136727 | 5/2005 |

(Continued)

*Primary Examiner* — Jamie J Atala
*Assistant Examiner* — James T Boylan
(74) *Attorney, Agent, or Firm* — Wenderoth, Lind & Ponack, L.L.P.

(57) ABSTRACT

An imaging device of the present disclosure includes: an optical system including a focus lens; an imaging system configured to generate image data based on an image obtained by the optical system; a DFD processing unit configured to calculate DFD distance information regarding a subject distance based on a plurality of blur signals and a plurality of pieces of image data having different focusing positions, the image data being obtained from the imaging system following drive of the focus lens; a measuring unit configured to measure a variation of a subject image of the image data; and a control unit configured to control the DFD processing unit to calculate the DFD distance information when the variation is equal to or more than a predetermined value.

8 Claims, 6 Drawing Sheets

(56) References Cited

U.S. PATENT DOCUMENTS

| | | | | |
|---|---|---|---|---|
| 2009/0273704 | A1* | 11/2009 | Pincenti | H04N 5/23212 348/349 |
| 2010/0053417 | A1* | 3/2010 | Baxansky | H04N 5/23212 348/345 |
| 2012/0301009 | A1* | 11/2012 | Dabic | G07D 5/005 382/136 |
| 2013/0121537 | A1* | 5/2013 | Monobe | H04N 5/23254 382/106 |
| 2013/0141393 | A1* | 6/2013 | Chen | G06F 3/0428 345/175 |
| 2014/0184888 | A1* | 7/2014 | Won | G03B 13/36 348/352 |
| 2014/0253760 | A1* | 9/2014 | Watanabe | H04N 5/142 348/239 |
| 2015/0029357 | A1* | 1/2015 | Hamalainen | G02B 7/36 348/223.1 |
| 2015/0042839 | A1* | 2/2015 | Komatsu | H04N 5/23212 348/222.1 |
| 2015/0054972 | A1* | 2/2015 | Hashimoto | G02B 7/34 348/216.1 |
| 2015/0098644 | A1* | 4/2015 | Atif | G06T 5/001 382/154 |
| 2015/0201121 | A1* | 7/2015 | Nobayashi | G02B 7/34 348/222.1 |
| 2015/0312469 | A1* | 10/2015 | Chang | G03B 13/36 348/349 |

FOREIGN PATENT DOCUMENTS

| | | |
|---|---|---|
| JP | 2007-139893 | 6/2007 |
| JP | 2010-62987 | 3/2010 |
| JP | 2010-177741 | 8/2010 |
| JP | 2013-44844 | 3/2013 |
| WO | 2007/086378 | 8/2007 |

* cited by examiner

IMAGING DEVICE FOR PERFORMING DFD PROCESSING AT APPROPRIATE TIMING

BACKGROUND OF THE INVENTION

1. Field of the Invention

The present disclosure relates to an imaging device such as a digital camera and a cellular phone.

2. Description of the Related Art

There have been proposed various methods for contactlessly measuring a depth of a three-dimensional scene, that is, a distance to each of subjects. The methods are roughly classified into active methods and passive methods. In the active methods, an infrared ray, an ultrasonic wave, a laser beam or the like is radiated onto the subject, and the distance is calculated based on a time taken until a reflected wave returns or an angle of the reflected wave. In the passive methods, the distance is calculated based on an image of the subject. Particularly in a camera, the passive methods, which do not require a device for radiating the infrared ray or the like, are widely used.

As one of the passive methods, a DFD (Depth from Defocus) method (hereinafter, referred to as DFD) is disclosed. The DFD measures the distance based on information regarding a blur in which a size and a shape are changed depending on a subject distance. The DFD has features that a plurality of cameras are not required, and that the distance can be measured from a small number of images. Processing for measuring the distance to the subject by using the DFD is referred to as DFD processing.

A description is briefly made below of a principle of the DFD. The DFD is a method of measuring the distance based on the blur information from a plurality of images having different focusing positions. Each of shot images including the blur becomes an image in which a point spread function that is a function of the subject distance is convolved with an all-focused image that shows a state where there is no blur by a lens. The point spread function is a function that uses the subject distance as a variable, and accordingly, the blur is detected from a blurred image in the DFD, whereby the subject distance can be obtained.

At this time, the all-focused image and the subject distance are unknown. One expression regarding the blurred image, the all-focused image, and the subject distance is established for one blurred image. A new expression is obtained when a blurred image having a different focusing position is newly shot. Accordingly, the subject distance is obtained by solving a plurality of obtained expressions. Regarding a method for acquiring the expressions, a method for solving the expressions, and the like, various methods including PTL 1, are disclosed.

CITATION LIST

Patent Literature

PTL 1: Japanese Patent No. 2,963,990

SUMMARY OF THE INVENTION

When the DFD processing is always performed, not only a quantity of power consumption is increased, but also a focused state of a subject image is changed following drive of a focus lens, and visibility of the subject image to a user is lowered.

It is an object of the present disclosure to provide an imaging device capable of performing the DFD processing at appropriate timing.

An imaging device of the present disclosure includes: an optical system including a focus lens; an imaging system configured to generate image data based on an image obtained by the optical system; a DFD processing unit configured to calculate DFD distance information regarding a subject distance based on a plurality of blur signals and a plurality of pieces of image data having different focusing positions, the image data being obtained from the imaging system following drive of the focus lens; a measuring unit configured to measure a variation of a subject image of the image data; and a control unit configured to control the DFD processing unit to calculate the DFD distance information when the variation is equal to or more than a predetermined value.

According to the present disclosure, it is possible to provide the imaging device capable of performing the DFD processing at appropriate timing.

DETAILED DESCRIPTION OF THE PREFERRED EMBODIMENTS

A description is made below in detail of exemplary embodiments with reference to the drawings as appropriate. However, a detailed description more than necessary is omitted in some cases. For example, a detailed description of a matter that is already well known and a duplicate description of substantially the same configurations are omitted in some cases. This omission is made for the purpose of avoiding unnecessary redundancy of the following description and facilitating the understanding of those skilled in the art.

Note that the accompanying drawings and the following description are provided for the purpose of allowing those skilled in the art to fully understand the present disclosure, and it is not intended to limit the subject matter described in the claims by these drawings and description.

1. First Exemplary Embodiment

A description is made of a first exemplary embodiment with reference to FIG. 1 to FIG. 4.

1-1. Configuration

A description is made of an electrical configuration of imaging device 100 in this exemplary embodiment.

Figure 1:
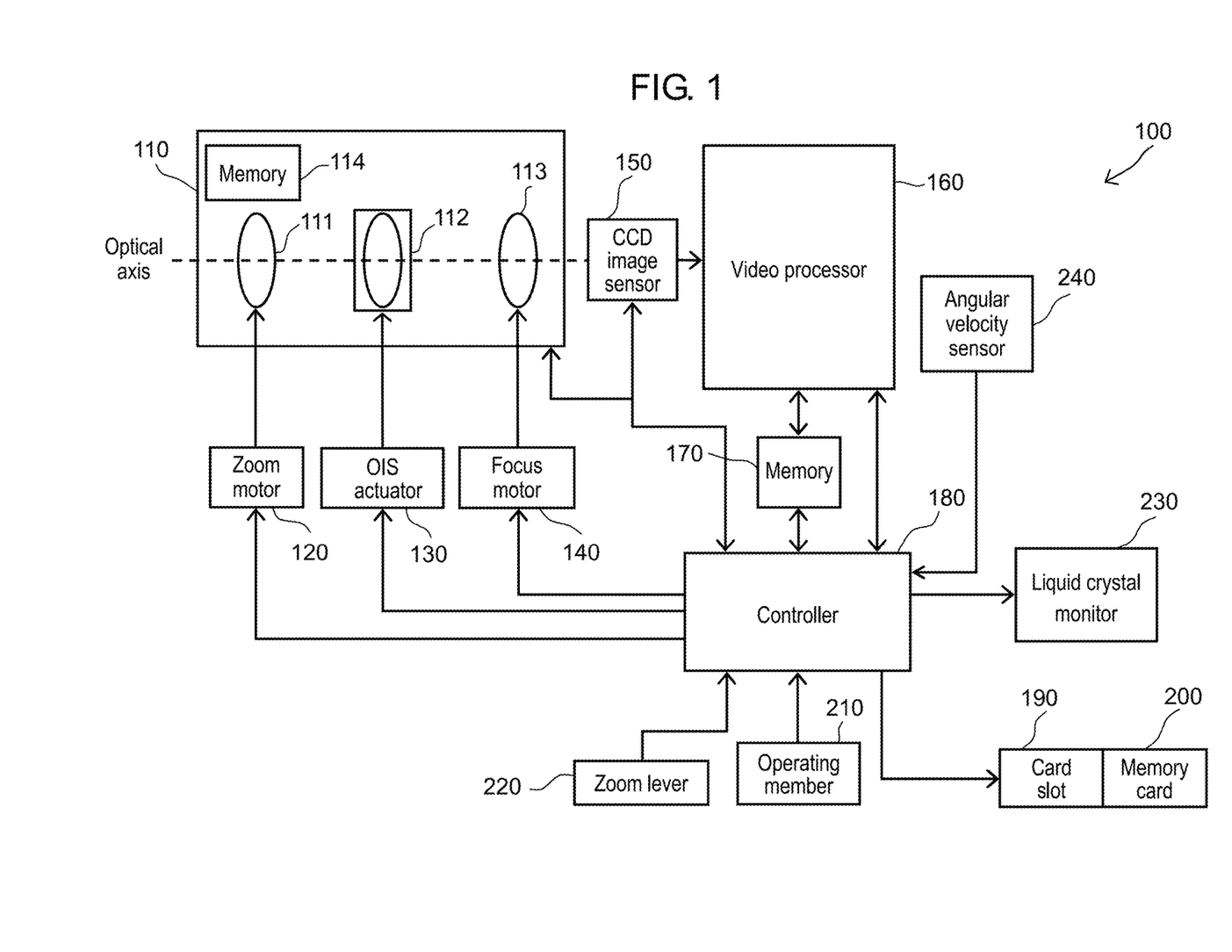
FIG. 1 is a block diagram illustrating a configuration of an imaging device according to a first exemplary embodiment.

FIG. 1 is a block diagram illustrating a configuration of imaging device 100 according to this exemplary embodiment. Imaging device 100 includes: optical system 110; zoom motor 120; OIS (Optical Image Stabilizer) actuator 130; focus motor 140; CCD (Charge Coupled Device) image sensor 150; video processor 160; non-transitory computer-readable memory 170; controller 180; card slot 190; memory card 200; operating member 210; zoom lever 220; liquid crystal monitor 230; and angular velocity sensor 240. In this exemplary embodiment, imaging device 100 is a digital camera.

Optical system 110 includes zoom lens 111, OIS 112, focus lens 113, and non-transitory computer-readable memory 114.

Zoom lens 111 is a lens for magnifying or reducing a subject image, which is formed on CCD image sensor 150, by moving along an optical axis shown by a broken line of optical system 110. Based on a control signal from controller 180, a position of zoom lens 111 in optical system 110 is changed by zoom motor 120.

Note that zoom lens 111 does not have to have a zoom function, and may be a simple lens.

OIS 112 includes therein a correction lens which is movable in a plane perpendicular to the optical axis. OIS 112 drives the correction lens in a direction of canceling a shake of imaging device 100, thereby reducing a shake of the subject image formed by optical system 110. The correction lens can move about the optical axis in the plane, in OIS 112, which is perpendicular to the optical axis of optical system 110. OIS 112 is controlled by OIS actuator 130.

Focus lens 113 is a lens for adjusting a focus on the subject image by moving along the optical axis of optical system 110. Focus lens 113 is controlled by focus motor 140.

Memory 114 holds lens parameter information inherent in optical system 110.

Zoom motor 120 drives and controls zoom lens 111. Zoom motor 120 may be realized by a pulse motor, a DC motor, a linear motor, a servo motor or the like, and may drive zoom lens 111 through a cam mechanism or a mechanism such as a ball screw.

OIS actuator 130 drives and controls the correction lens in OIS 112 in the plane perpendicular to the optical axis. OIS actuator 130 can be realized by a flat coil, an ultrasonic motor or the like.

Focus motor 140 drives and controls focus lens 113. Focus motor 140 may be realized by a pulse motor, a DC motor, a linear motor, a servo motor or the like, and may drive focus lens 113 through a cam mechanism or a mechanism such as a ball screw.

CCD image sensor 150 shoots the image formed by optical system 110, and generates an image signal. CCD image sensor 150 performs operations such as exposure, transfer, and an electronic shutter. CCD image sensor 150 corresponds to an imaging element.

Note that a CMOS (Complementary Metal-Oxide Semiconductor) image sensor may be used in place of CCD image sensor 150.

Video processor 160 performs various pieces of processing for the image signal generated by CCD image sensor 150. Video processor 160 performs the processing for the image signal, and generates image data (hereinafter, referred to as a through image) to be displayed on liquid crystal monitor 230. Moreover, video processor 160 generates a video signal to be stored in memory card 200. Furthermore, video processor 160 performs video processing such as a gamma correction, a white balance correction, and a flaw correction on the image signal. Video processor 160 also performs DFD processing to be described later.

Video processor 160 can be realized by a DSP (Digital Signal Processor), a microcomputer or the like. A resolution of the through image may be set at a screen resolution of liquid crystal monitor 230, or may be set at a resolution of image data compressed and formed by a compression format compliant with the JPEG (Joint Photographic Experts Group) standard, and the like.

Memory 170 functions as a work memory of video processor 160 and controller 180. For example, memory 170 temporarily accumulates the video signal, which is processed by video processor 160, or image data which is still unprocessed by video processor 160 and is input from CCD image sensor 150.

Moreover, memory 170 temporarily accumulates shooting conditions of optical system 110 and CCD image sensor 150 at the time of shooting. The shooting conditions are viewing angle information, an ISO (International Organization for Standardization) sensitivity, a shutter speed, an EV (Exposure Value) value, an F value (aperture value), an inter-lens distance, a shooting time, an OIS shift amount, position information of focus lens 113 in optical system 110.

Moreover, when optical system 110 is interchangeable, memory 170 stores blur signals (hereinafter, referred to as basic blur signals), which are commonly usable by a plurality of optical systems 110, in association with indices (blur signal indices). Here, each of the basic blur signals corresponds to a blur shape. Moreover, there are a plurality of basic blur signals, and the plurality of the basic blur signals are collectively referred to as a basic blur set.

Furthermore, memory 170 stores the lens parameter information of optical system 110, which is acquired by controller 180. For example, memory 170 can be realized by a DRAM (Dynamic Random Access Memory), a ferroelectric memory, or the like.

Controller 180 controls the whole of imaging device 100. Controller 180 can be realized by a semiconductor element or the like. Controller 180 may be configured only by hardware, or may be realized by combining the hardware and software with each other. Controller 180 can be realized by a microcomputer or the like.

Controller 180 performs control to calculate information regarding a distance for the subject of which image is formed by optical system 110. Specifically, controller 180 acquires the lens parameter information of optical system 110. Then, controller 180 controls video processor 160 to perform the DFD processing based on the plurality of blur signals stored in memory 170, the lens parameter information of optical system 110, and a plurality of image signals having different focusing positions obtained by the shooting by CCD image sensor 150 and then to calculate information regarding distance. For example, the information regarding the distance is a distance from imaging device 100 to the subject. In other words, the information regarding the distance is a distance of the subject, which is shot by CCD image sensor 150, in a depth direction when viewed from imaging device 100. A reference point of the distance can be arbitrarily set; however, for example, the reference point is set on a position of a predetermined lens included in optical system 110. Hereinafter, the information regarding the distance is referred to as DFD distance information.

Note that, before performing the control for the DFD processing, controller 180 may previously acquire the lens parameter information from optical system 110, and may store the acquired lens parameter information in memory 170, or may read the lens parameter information from optical system 110 when controlling the DFD processing. Moreover, controller 180 may perform control to accumulate all of the lens parameter information of optical system 110 in memory 170. In this case, controller 180 may delete a part of the lens parameter information, which is accumulated in memory 170, by a user operation input through operating member 210.

Note that the lens parameter information may include lens parameter information of optical systems 110, which have been heretofore attached, and may further include lens parameter information of lenses which are still unattached.

Controller 180 performs control to acquire the lens parameter information inherent in optical system 110 for guiding light from the subject to CCD image sensor 150, the information specifying a part of the plurality of basic blur signals, and then to calculate the information regarding the distance of the subject, which is shot by CCD image sensor 150, based on a plurality of distance-measuring blur signals specified by the acquired lens parameter information among the plurality of basic blur signals held in memory 170.

Card slot 190 is mechanically and electrically connectable to memory card 200, writes information into memory card 200, and reads information from memory card 200. Card slot 190 detachably attaches memory card 200 thereto.

Memory card 200 is a non-transitory computer-readable recording medium which includes therein a flash memory, a ferroelectric memory or the like. Memory card 200 is detachably attached to card slot 190.

Operating member 210 includes a release button. The release button receives a depressing operation of the user. When the user half-depresses the release button, AF (Auto-Focus) control and AE (Automatic Exposure) control are started through controller 180. Moreover, when the user fully depresses the release button, the subject is shot.

Zoom lever 220 is a member that receives an instruction to change a zoom magnification from the user.

Liquid crystal monitor 230 is a display device that displays the image signal generated by CCD image sensor 150, or the image signal read out from memory card 200. Moreover, liquid crystal monitor 230 is capable of displaying various pieces of setting information for imaging device 100. For example, liquid crystal monitor 230 is capable of displaying the EV value, the F value, the shutter speed, the ISO sensitivity or the like, which is the shooting condition at the time of shooting.

1-2. Operation in Shooting Still Image

Figure 2:
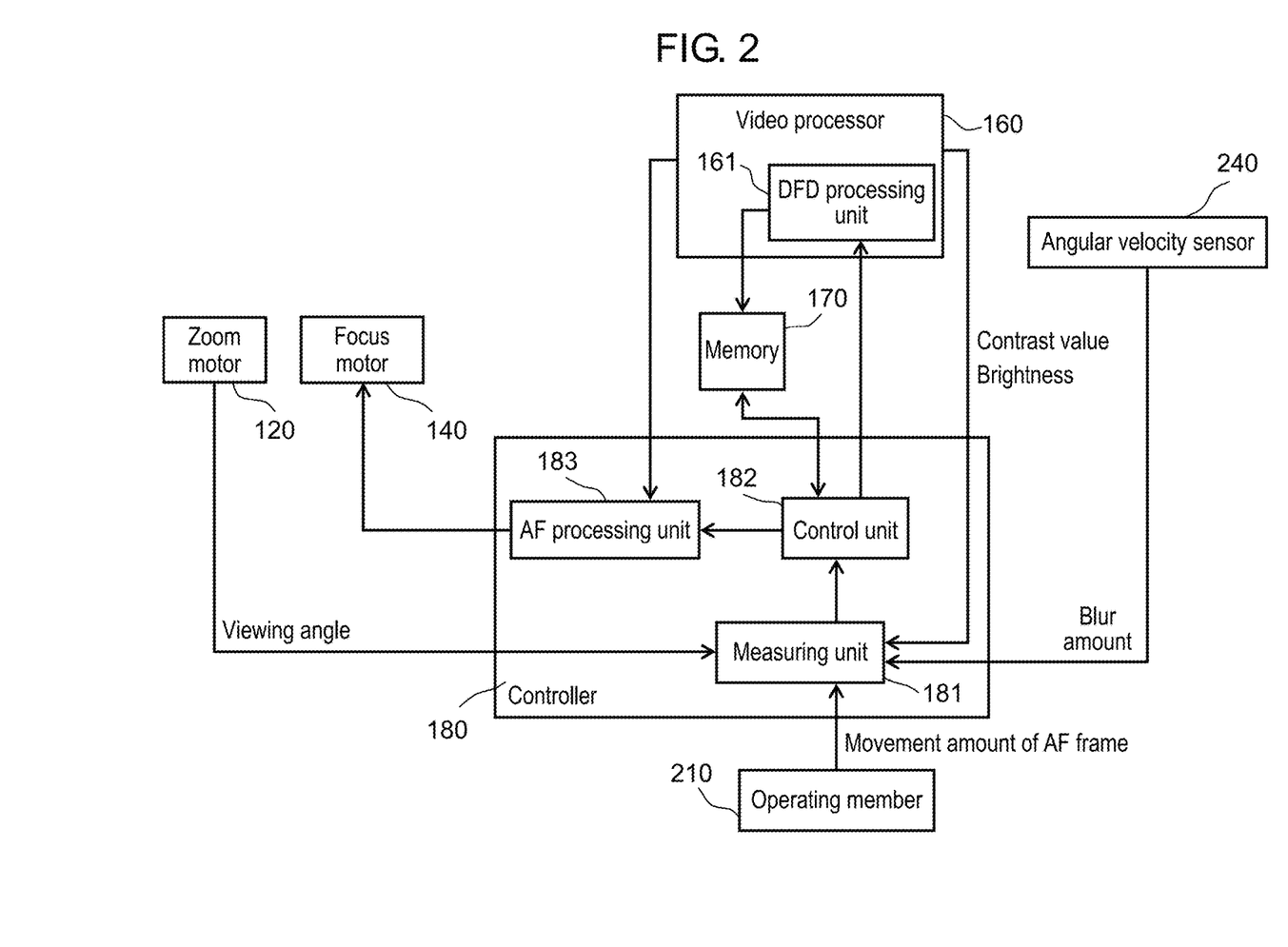
FIG. 2 is a block diagram in which configurations regarding shooting operations in the imaging device of FIG. 1 are mainly taken out.
Figure 3A:
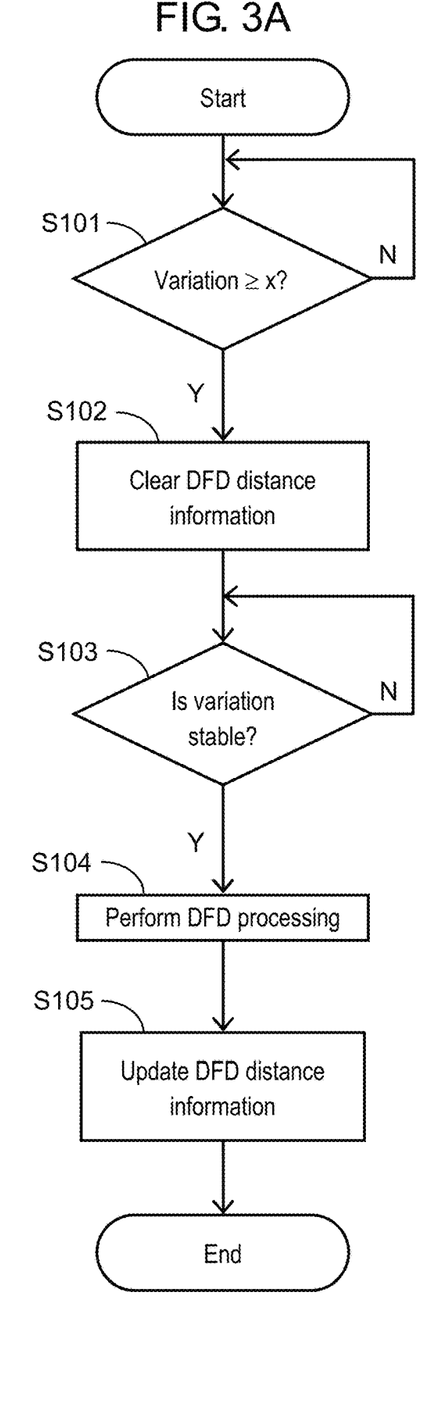
FIG. 3A is a flowchart for updating DFD distance information according to the first exemplary embodiment.
Figure 3B:
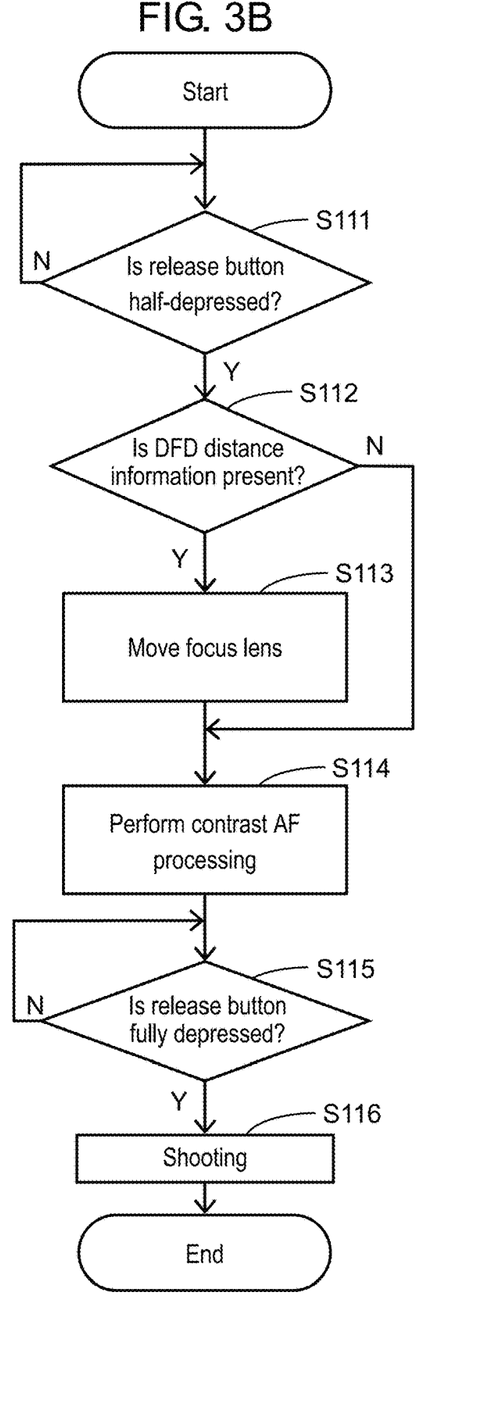
FIG. 3B is a flowchart of shooting operations according to the first exemplary embodiment.

A description is made of shooting operations of imaging device 100 in the first exemplary embodiment. FIG. 2 is a block diagram in which configurations regarding the shooting operations in imaging device 100 described with reference to FIG. 1 are mainly taken out, illustrating configurations of video processor 160 and controller 180 in detail. FIG. 3A is a flowchart for updating the DFD distance information, and FIG. 3B is a flowchart of the shooting operations of imaging device 100.

In FIG. 2, video processor 160 includes DFD processing unit 161, and controller 180 includes measuring unit 181, control unit 182, and AF processing unit 183.

When the user turns on a power supply of imaging device 100, imaging device 100 displays the subject image, which is formed on CCD image sensor 150 by optical system 110, on liquid crystal monitor 230 through video processor 160 and controller 180. At this time, the through image, which is the subject image displayed on liquid crystal monitor 230, is a moving image realized by sequentially displaying image data obtained from CCD image sensor 150. Imaging device 100 updates the image data, which is obtained by CCD image sensor 150, for each frame rate that is a predetermined time interval, and displays the image data as the through image on liquid crystal monitor 230. Hereinafter, one piece of data in the moving image data displayed as the through image is referred to as one frame.

(S101) Measuring unit 181 measures a variation of the subject image, and determines whether or not the variation exceeds a threshold value x. Here, the variation of the subject image is, for example, a variation of a viewing angle, which is a movement amount of zoom lens 111, a blur amount corrected by OIS 112, a variation of brightness of light formed into an image on CCD image sensor 150, a movement amount of an AF frame that is a distance measuring point for autofocus, which is switched by operating member 210, a variation of a contrast value of the subject image generated by video processor 160, and the like. Measuring unit 181 detects the variation of the subject image between the respective frames of the through image. Specifically, measuring unit 181 obtains the viewing angle from zoom lens 111 to measure the variation of the viewing angle, obtains the blur amount from angular velocity sensor 240 to measure the variation of the blur amount, obtains the brightness from video processor 160 to detect the variation of the brightness, obtains a position of the frame for the AF from operating member 210 to measure the movement amount of the AF frame, and obtains the contrast value from video processor 160 to measure the variation of the contrast value. Control unit 182 is notified of variations measured by measuring unit 181.

Among a variety of the variations notified from measuring unit 181, if all of the variations have values smaller than the threshold values x thereof (if N), control unit 182 performs control to return to the processing of S101. Among the variety of variations notified from measuring unit 181, if at least one variation is equal to or more than the threshold value x (if Y), control unit 182 performs control to proceed to the processing of S102.

(S102) Control unit 182 performs control to clear the DFD distance information held in memory 170.

(S103) Control unit 182 performs control to determine whether or not the variation of the subject image is stable. Whether or not the variation of the subject image is stable can be determined by confirming whether or not the variation notified from measuring unit 181 stays within a predetermined range during a predetermined time. If it is determined that at least one of the variety of variations notified from measuring unit 181 is not stable during the predetermined time (if N), control unit 182 performs control to return to the processing of S103. If it is determined that all of the variety of variations notified from measuring unit 181 are stable during the predetermined time (if Y), control unit 182 performs control to proceed to the processing of S104.

Figure 4:
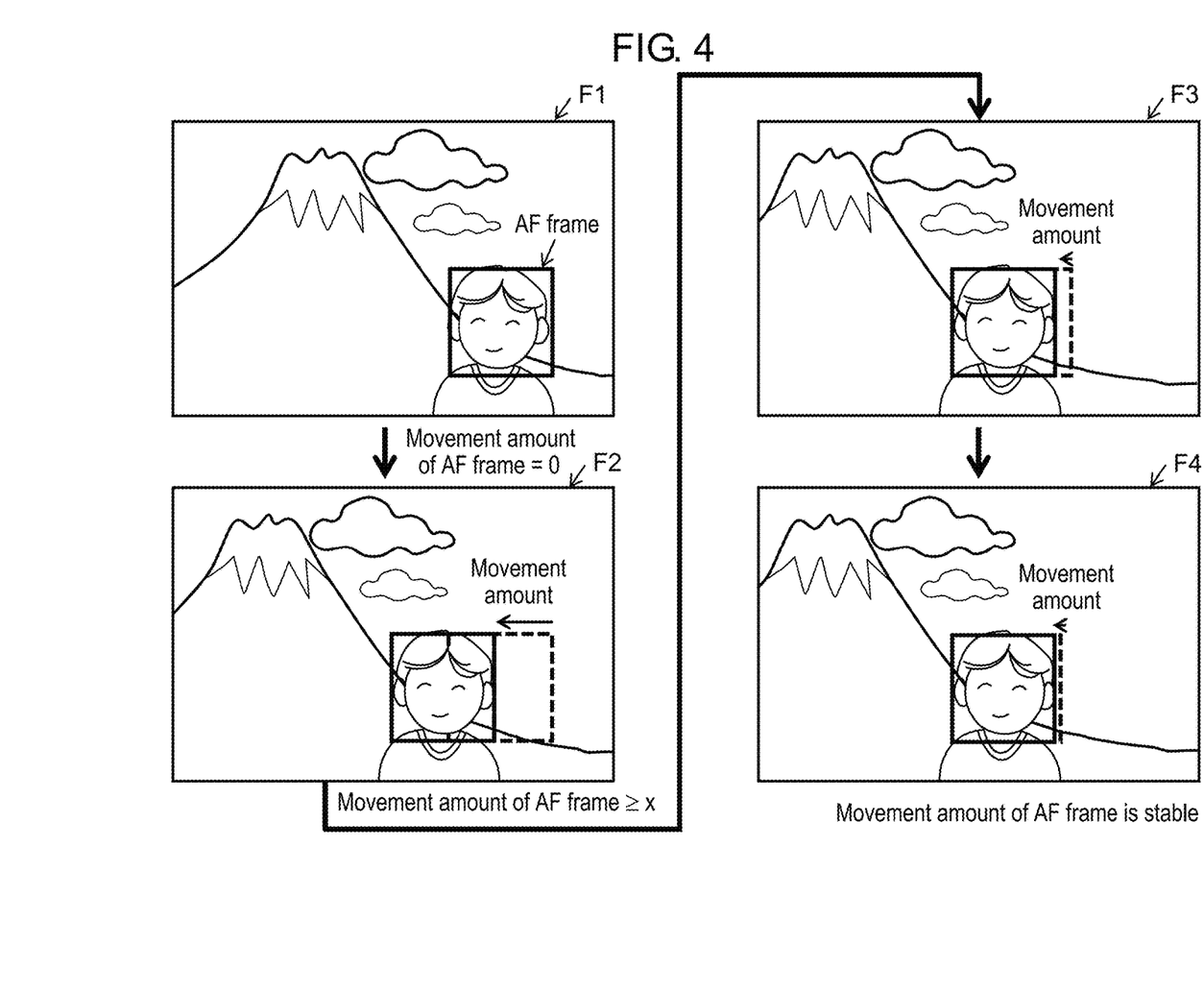
FIG. 4 is a view for describing a variation of a subject image according to the first exemplary embodiment.

Here, with reference to the drawing, a description is made of the movement amount of the AF frame as an example of the variations of the subject image. FIG. 4 is a view for describing the movement amount of the AF frame. Here, it is assumed that digital camera 100 operates in a tracking AF mode where the AF frame moves following a movement of a specific subject. In FIG. 4, frame F1 shows one frame in the through image, and a position of the AF frame is shown on frame F1. This position of the AF frame is taken as a reference position. In frame F1, the movement amount of the AF frame is 0 since the position of the AF frame is the reference position. Next, in frame F2, it is shown that the AF frame moves to the left from the reference position, and that the AF frame moves by the threshold value x or more. Next, in frame F3, although the AF frame moves to the left from the position of the AF frame in frame F2, a movement amount of the AF frame between frame F2 and frame F3 is smaller than the movement amount of the AF frame between frame F1 and frame F2. Finally, in frame F4, although the AF frame moves to the left from the position of the AF frame in frame F3, it is shown that this movement amount stays within the predetermined range during the predetermined time, and that the movement amount of the AF frame is stable. When the movement amount of the AF frame is stabilized, the processing proceeds to DFD processing of S104.

(S104) Control unit 182 controls DFD processing unit 161 to perform the DFD processing.

Here, a reason for determining whether or not the variation of the subject image is stable is to determine whether or not the user has captured the subject image desired to be focused. That is, when the variation of the subject image is not stable, it is highly likely that the user has not captured the subject image desired to be focused. Even if the DFD processing is performed in such a case, it is less likely that the DFD distance information is used later, and accordingly, the DFD processing is not performed until the variation of the subject image is stabilized.

(S105) Control unit 182 performs control to store the obtained DFD distance information in memory 170, and updates the DFD distance information.

The operations of FIG. 3A are repeatedly performed during a period in which the through image is displayed after the power supply of imaging device 100 is turned on.

When the shooting operations for the still image by imaging device 100 in FIG. 3B are started, the processing of FIG. 3A is discontinued by control unit 182 no matter which processing of steps S101 to S105 is being performed. When the release button is operated by the user, the operations of FIG. 3A are discontinued. That is, when the user operates the release button in imaging device 100 in this exemplary embodiment, the processing of FIG. 3A is discontinued and the shooting operations of FIG. 3B are performed.

(S111) Control unit 182 determines whether or not the user half-depresses the release button located in operating member 210, that is, measuring unit 181 determines whether or not the release button included in operating member 210 is depressed by the user, and measures an amount of the depression when the release button is depressed, and notifies control unit 182 of a result of this measurement. Control unit 182 determines whether or not the release button is half-depressed based on the notified result. If the release button is not half-depressed (if N), control unit 182 performs control to return to the processing of S111. If the release button is half-depressed (if Y), control unit 182 performs control to proceed to the processing of S112.

(S112) Control unit 182 determines whether or not the DFD distance information is present in memory 170. If the DFD distance information is not present (if N), control unit 182 performs control to proceed to the processing of S114. The case where the DFD distance information is not present is a case where, with regard to the operations of FIG. 3B, the shooting operations are started during a period from when the DFD distance information is cleared by the processing of S102 in FIG. 3A until when the DFD distance information is updated by the processing of S105. If the DFD distance information is present in memory 170 (if Y), control unit 182 performs control to proceed to the processing of S113.

(S113) Control unit 182 controls AF processing unit 183 to calculate a position of focus lens 113, which corresponds to the DFD distance information in memory 170, and drives focus motor 140 to move focus lens 113 to the calculated position.

(S114) Control unit 182 controls AF processing unit 183 to perform contrast AF processing for moving focus lens 113 so that a contrast value of the subject image, which is obtained from video processor 160, becomes a maximum value.

In the case where the DFD distance information is present in memory 170 in S112, it is highly likely that, at the time of performing the processing of S114, focus lens 113 may be already located in a vicinity of a position, where the contrast value becomes the maximum value. Hence, the contrast AF processing can be performed in a short time as compared to the case where the DFD distance information is not present in memory 170 in the processing of S112.

(S115) Next, control unit 182 determines whether or not the user fully depresses the release button located in operating member 210, that is, measuring unit 181 determines whether or not the release button included in operating member 210 is depressed by the user, and measures an amount of depression when the release button is depressed, and notifies control unit 182 of a result of this measurement. Control unit 182 determines whether or not the release button is fully depressed based on the notified result. If the release button is not fully depressed (if N), control unit 182 performs control to return to the processing of S115. If the release button is fully depressed (if Y), control unit 182 performs control to proceed to the processing of S116.

(S116) Controller 180 controls optical system 110, CCD image sensor 150 and video processor 160 to perform the shooting operations, and performs control to record the shot still image in memory card 200.

1-3. Effects and the Like

As described above, in the still image shooting, imaging device 100 in this exemplary embodiment measures the variation of the subject image, and performs the DFD processing after the variation is stabilized. In this way, the DFD distance information is obtained at appropriate timing when the subject image is focused, and a speed of the contrast AF processing can be accelerated as compared to the case where the DFD processing is not performed. Moreover, the DFD processing is not performed during the period in which the variation of the subject image is smaller than the threshold value, and accordingly, power consumption occurring in video processor 160, memory 170, controller 180 and the like can be suppressed. Moreover, in the DFD processing, a frequency at which visibility of the through image displayed on liquid crystal monitor 230 is lowered by the movement of focus lens 113 can also be suppressed.

Note that, in this exemplary embodiment, the shooting operations have been described as the operations at the time of shooting the still image; however, the present disclosure is not limited thereto. For example, the present disclosure is also effective in a case of performing the AF operation by the operation of the user at the time of shooting a moving image.

Moreover, in this exemplary embodiment, there is adopted the configuration in which the variation of the through image between the frames is detected; however, the present disclosure is not limited thereto. There may be adopted a configuration in which, for a plurality of the frames, variations thereof with respect to a reference frame are individually detected, and the DFD distance information is cleared when all of the variations exceed a predetermined threshold value. At this time, the reference frame is defined to be a head frame among the plurality of frames. Moreover, the variations may be detected not for all of the plurality of frames but for a part of the frames.

Furthermore, in this exemplary embodiment, as the variation of the subject image, there are measured all of the variations, i.e., the variation of the viewing angle, the variation of the blur amount, the variation of the brightness, the movement amount of the AF frame, and the variation of the contrast value; however, the present disclosure is not limited thereto. There may be adopted a configuration in which at least one variation is measured among these variations.

2. Second Exemplary Embodiment

In a second exemplary embodiment, a description is made of moving image shooting operations of imaging device 100 described in the first exemplary embodiment. A configuration of imaging device 100 is the same as those in FIG. 1 and FIG. 2, which are described in the first exemplary embodiment.

The description is made of the moving image shooting operations of the second exemplary embodiment with reference to FIG. 5A, FIG. 5B, FIG. 6A and FIG. 6B.

2-1. Operations in Shooting Moving Image

Figure 5A:
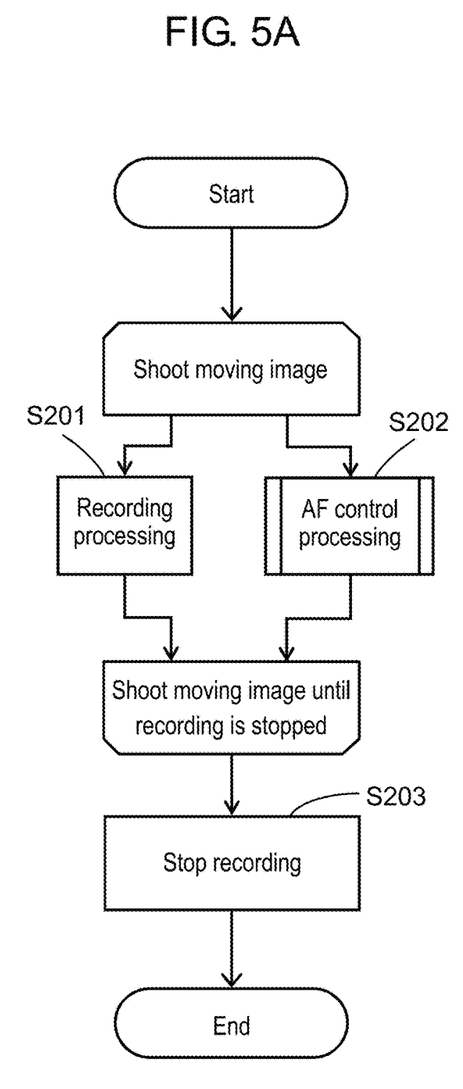
FIG. 5A is a flowchart of moving image shooting of an imaging device according to a second exemplary embodiment.
Figure 5B:
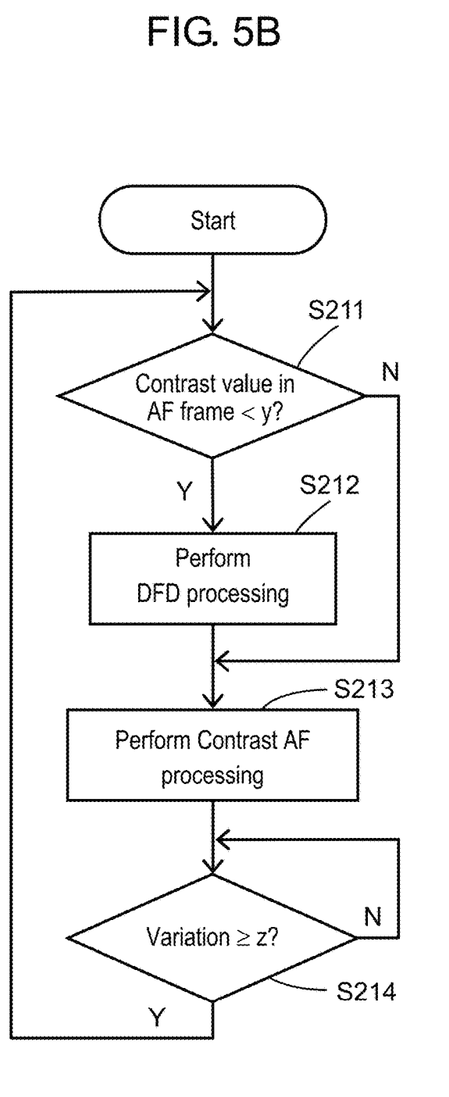
FIG. 5B is a flowchart of AF control processing at the time of moving image shooting of the imaging device according to a second exemplary embodiment.

FIG. 5A is a flowchart of moving image shooting of imaging device 100, and FIG. 5B is a flowchart of AF control processing at the time of shooting a moving image. The moving image shooting is started by moving image shooting operations for operating member 210 by the user.

(S201) Controller 180 performs recording processing for recording a video signal, which is generated by video processor 160, into memory card 200.

(S202) In parallel to the recording processing in S201, controller 180 performs the AF control processing.

(S203) Upon receiving an instruction to stop the moving image shooting, the instruction being made by the user by using operating member 210, controller 180 stops recording the video signal, which is generated by video processor 160, into memory card 200.

Next, a description is made of the AF control processing of S202 with reference to FIG. 5B.

(S211) By referring to the contrast value in the AF frame, which is obtained from video processor 160, it is determined whether or not the contrast value is equal to or less than a threshold value y. The contrast value in the AF frame is used when contrast AF is performed. If the contrast value in the AF frame is smaller than the threshold value y (if Y), control unit 182 performs control to proceed to the processing of S212. If the contrast value in the AF frame is equal to or more than the threshold value y (if N), control unit 182 performs control to proceed to the processing of S213.

(S212) Control unit 182 controls DFD processing unit 161 to perform the DFD processing.

(S213) Control unit 182 controls AF processing unit 183 to perform the contrast AF processing for moving focus lens 113 so that the contrast value of the subject image, which is obtained from video processor 160, becomes the maximum value.

(S214) Next, measuring unit 181 measures the variation of the subject image, and determines whether or not the variation exceeds a threshold value z. The determination of the variation herein is the same processing as that of S101 of the first exemplary embodiment. Among a variety of the variations notified from measuring unit 181, if all of the variations have values smaller than the threshold values z thereof (if N), control unit 182 performs control to return to the processing of S214. Among the variety of variations notified from measuring unit 181, if at least one variation is equal to or more than the threshold value z (if Y), control unit 182 performs control to proceed to the processing of S211.

Here, by determining whether or not the variation of the subject image exceeds the threshold value z, unnecessary drive of focus lens 113 in the case where the subject is not changed can be suppressed.

In FIG. 5A, upon receiving the instruction to stop the moving image shooting, which is made by the user by operating member 210, the AF control processing in FIG. 5B is discontinued by control unit 182 during any processing of steps S211 to S214.

2-2. Effects and the Like

As described above, in the moving image shooting operations of imaging device 100 in this exemplary embodiment, the DFD processing is performed when the contrast value in the AF frame is low, whereby the DFD distance information is obtained in a large blur state which is relatively difficult to be dealt with by the contrast AF, and the subsequent contrast AF processing can be performed smoothly.

That is, controller 180 acquires information regarding a drive direction and a drive position of focus lens 113 from the DFD distance information. Focus lens 113 is driven based on this information, whereby focus lens 113 can be suppressed from being driven in a wrong direction. Moreover, a time taken to drive focus lens 113 to a focused focal point can be reduced.

Moreover, since the DFD processing is performed in the large blur state, lowering of visibility of the recorded moving image, which is caused by the movement of focus lens 113 in the DFD processing, can be suppressed. That is, in the case where the recorded moving image is reproduced, an occurrence of a change of a focused state by the drive of focus lens 113 can be restricted only when the subject desired to be focused by the user is in the large blur state.

Figure 6A:
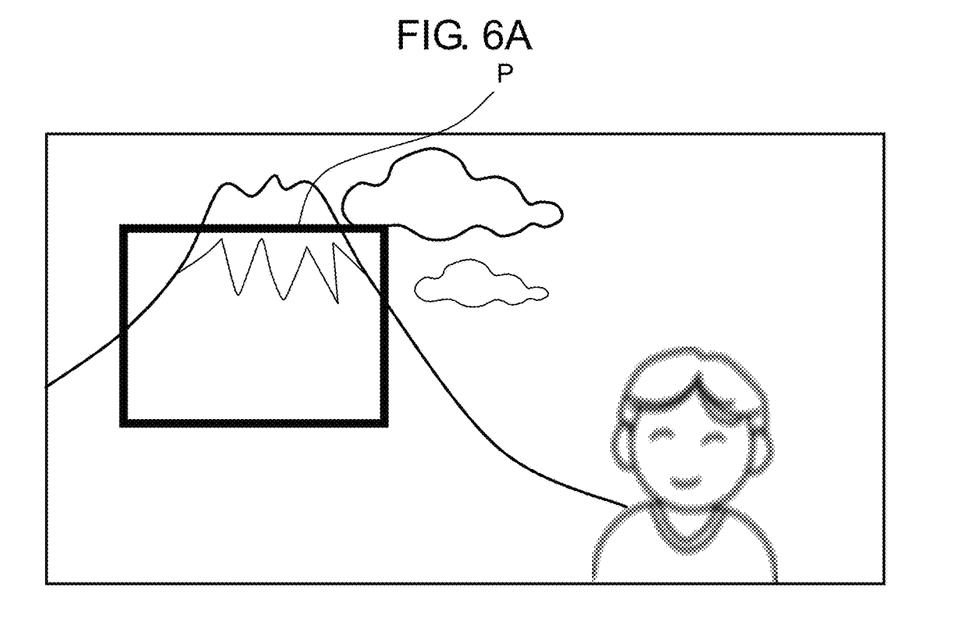
FIG. 6A is a view illustrating an example of a moving image under recording, which is displayed on a liquid crystal monitor according to the second exemplary embodiment.
Figure 6B:
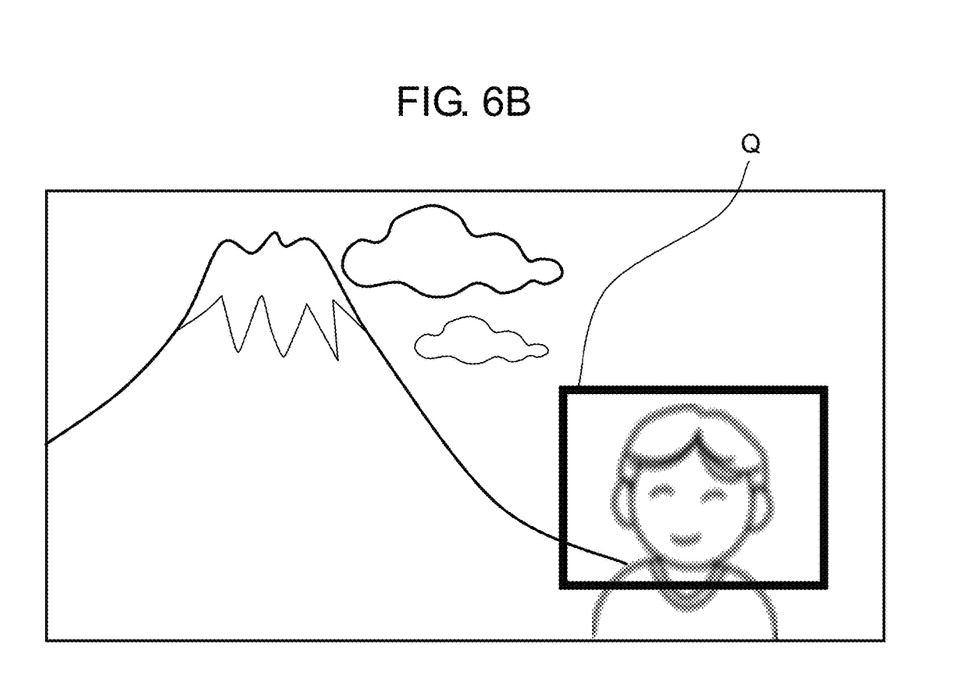
FIG. 6B is a view illustrating another example of the moving image under recording, which is displayed on the liquid crystal monitor according to the second exemplary embodiment.

With reference to FIG. 6A and FIG. 6B, a description is made of an example where a situation as described above may occur.

FIG. 6A is a view illustrating an example of the moving image under recording, which is displayed on liquid crystal monitor 230. FIG. 6B is a view illustrating another example of the moving image under recording, which is displayed on liquid crystal monitor 230. In FIG. 6A, focus lens 113 is located at such a position of focusing in frame P. In a case where the user changes a frame, which is focused, to frame Q as illustrated in FIG. 6B, a distance of a subject in frame P from focus lens 113 and a distance of a subject in frame Q from focus lens 113 are different from each other, and accordingly, it is highly likely that the contrast value may be lowered in frame Q. The DFD processing is performed in such a case, and accordingly, even if focus lens 113 is driven, the subject desired to be focused by the user is less affected.

Note that, in the second exemplary embodiment, the shooting operations have been described as the operations at the time of shooting the moving image; however, the present disclosure is not limited thereto. For example, the second exemplary embodiment is also effective in a mode such as continuous AF in which, at the time of shooting the still image, the AF operation is automatically performed, and the focusing is continuously performed.

3. Other Embodiments

As described above, the description has been made of the first and second exemplary embodiments as exemplifications of the technique of the present disclosure. However, the present disclosure is not limited thereto, and is also applicable to exemplary embodiments subjected to modification, substitution, addition, omission and the like. Moreover, it is also possible to form a new exemplary embodiment by combining the respective configurations described in the first and second exemplary embodiments with each other.

Accordingly, other exemplary embodiment is exemplified below.

In the first and second exemplary embodiments, optical system 110 is integrated with imaging device 100; however, the present disclosure is not limited thereto. For example, imaging device 100 may be configured as a lens interchangeable type from which optical system 110 is detachable, or may be configured as a unit interchangeable type in which optical system 110, CCD image sensor 150 and video processor 160 are integrated with one another.

Furthermore, in the first and second exemplary embodiments, the description has been made by using the digital camera as the imaging device; however, the present disclosure is not limited thereto. The present disclosure is also applicable to an electron telescope, an electron microscope, and the like, which require the distance measurement and focusing operations.

What is claimed is:

1. An imaging device comprising:
an optical system including a focus lens;
an imaging sensor configured to generate image data based on an image obtained by the optical system;
a memory;
a processor; and
a non-transitory computer-readable recording medium having stored thereon executable instructions, which when executed, cause the processor to function as:
a Depth from Defocus (DFD) processing unit configured to calculate DFD distance information regarding a subject distance based on a plurality of blur signals and a plurality of pieces of image data having different focusing positions, the image data being obtained from the imaging sensor following drive of the focus lens;
a measuring unit configured to measure a variation of a subject image of the image data; and
a control unit configured to control the DFD processing unit to calculate the DFD distance information, wherein the memory stores the DFD distance information, and
(A) when the measured variation is determined, by the control unit, to be equal to or more than a predetermined value, the control unit:
causes the DFD distance information to be cleared from the memory; and
determines whether or not the variation is stable, wherein
(B) when the control unit determines that the variation is stable, the control unit controls the DFD processing unit to calculate the DFD distance information, and the control unit causes the memory to store the calculated DFD distance information so as to update the previous DFD distance information, and
(C) when the control unit determines that the variation is not stable, the control unit does not control the DFD processing unit to calculate the DFD distance information, wherein
when a release button is half-depressed, the control unit discontinues processing (A), (B) and (C), and
(i) when the DFD distance information is present in the memory, the control unit causes the focus lens to move to a position which corresponds to the DFD distance information in the memory, and
(ii) when the DFD distance information is not present in the memory, the control unit causes the focus lens not to move.

2. The imaging device according to claim 1, wherein the variation is determined to be stable when the variation is determined, by the control unit, to stay within a range during a period of time.

3. The imaging device according to claim 1, wherein the executable instructions, when executed, cause the processor to further function as:
an AutoFocus (AF) processing unit configured to perform contrast AF processing in a predetermined frame of the image data,
wherein the control unit controls the AF processing unit to perform the contrast AF processing after driving the focus lens to a position corresponding to the DFD distance information.

4. The imaging device according to claim 1, wherein the executable instructions, when executed, cause the processor to further function as an AutoFocus (AF) processing unit configured to perform contrast AF processing in a predetermined frame of the image data,
when the measured variation is equal to or more than the predetermined value, the control unit further updates the DFD distance information in the memory, and
in shooting a still image, in a case where the DFD distance information is stored in the memory, the control unit controls the AF processing unit to perform the contrast AF processing after moving the focus lens to a position corresponding to the DFD distance information.

5. The imaging device according to claim 1, wherein the measuring unit measures at least one of a variation of a contrast value of the subject image, a variation of brightness, a variation of a viewing angle, a variation of a blur amount, and a movement amount of an AutoFocus (AF) frame as the variation.

6. The imaging device according to claim 1, wherein the measuring unit measures a contrast value in a predetermined frame of the image data, and
in shooting a moving image, the control unit controls the DFD processing unit to calculate the DFD distance information when the contrast value is equal to or less than a predetermined value.

7. The imaging device according to claim 5, wherein the control unit does not control the DFD processing unit to calculate the DFD distance information if the control unit determines that at least one of the variation of the contrast value of the subject image, the variation of brightness, the variation of the viewing angle, the variation of the blur amount, and the movement amount of the AF frame is not stable.

8. The imaging device according to claim 1, wherein the control unit is configured to determine whether or not the release button has been half-depressed.

* * * * *